United States Patent
Park et al.

(10) Patent No.: US 9,158,395 B2
(45) Date of Patent: Oct. 13, 2015

(54) METHOD AND SYSTEM FOR CONTROLLING OTHER DEVICES USING A REMOTE USER INTERFACE

(75) Inventors: Ho Yeon Park, Seoul (KR); Young Sun Ryu, Seongnam-si (KR); Sung Oh Hwang, Yongin-si (KR); Bo Sun Jung, Seongnam-si (KR); Jun Hyung Kim, Suwon-si (KR); Ji Eun Keum, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 800 days.

(21) Appl. No.: 12/753,397

(22) Filed: Apr. 2, 2010

(65) Prior Publication Data

US 2010/0257455 A1 Oct. 7, 2010

(30) Foreign Application Priority Data

Apr. 2, 2009 (KR) .................. 10-2009-0028470

(51) Int. Cl.
*G06F 3/01* (2006.01)
*G06F 3/038* (2013.01)
*G06F 3/02* (2006.01)
*H04L 29/08* (2006.01)

(52) U.S. Cl.
CPC .............. *G06F 3/038* (2013.01); *G06F 3/0227* (2013.01); *H04L 67/125* (2013.01); *H04L 67/16* (2013.01); *G06F 2203/0383* (2013.01)

(58) Field of Classification Search
CPC ........................................................ G06F 3/01
USPC ............................................................ 715/740
See application file for complete search history.

(56) References Cited

U.S. PATENT DOCUMENTS

| 6,020,881 A * | 2/2000 | Naughton et al. ............ 715/740 |
| 2003/0065407 A1* | 4/2003 | Johnson et al. .................. 700/19 |
| 2007/0250632 A1* | 10/2007 | Nomura et al. ................ 709/227 |

FOREIGN PATENT DOCUMENTS

KR 1020050046998 5/2005

OTHER PUBLICATIONS

Korean Office Action dated Apr. 30, 2015 issued in counterpart application No. 10-2009-0028470.

* cited by examiner

*Primary Examiner* — Peiyong Weng
(74) *Attorney, Agent, or Firm* — The Farrell Law Firm, P.C.

(57) ABSTRACT

A method and system wherein a device remotely controls a user interface being executed in a remote device, using a remote user interface. The device discovers a server that supports a remote control interface. The device receives a list of remote devices that the device can control from the server. A selection input is received to select a remote device from the list of remote devices. A device selection request corresponding to the selection input is transmitted to the server. A remote control interface corresponding to the device selection request is received from the server. The selected remote device is controlled via the received remote control interface.

16 Claims, 15 Drawing Sheets

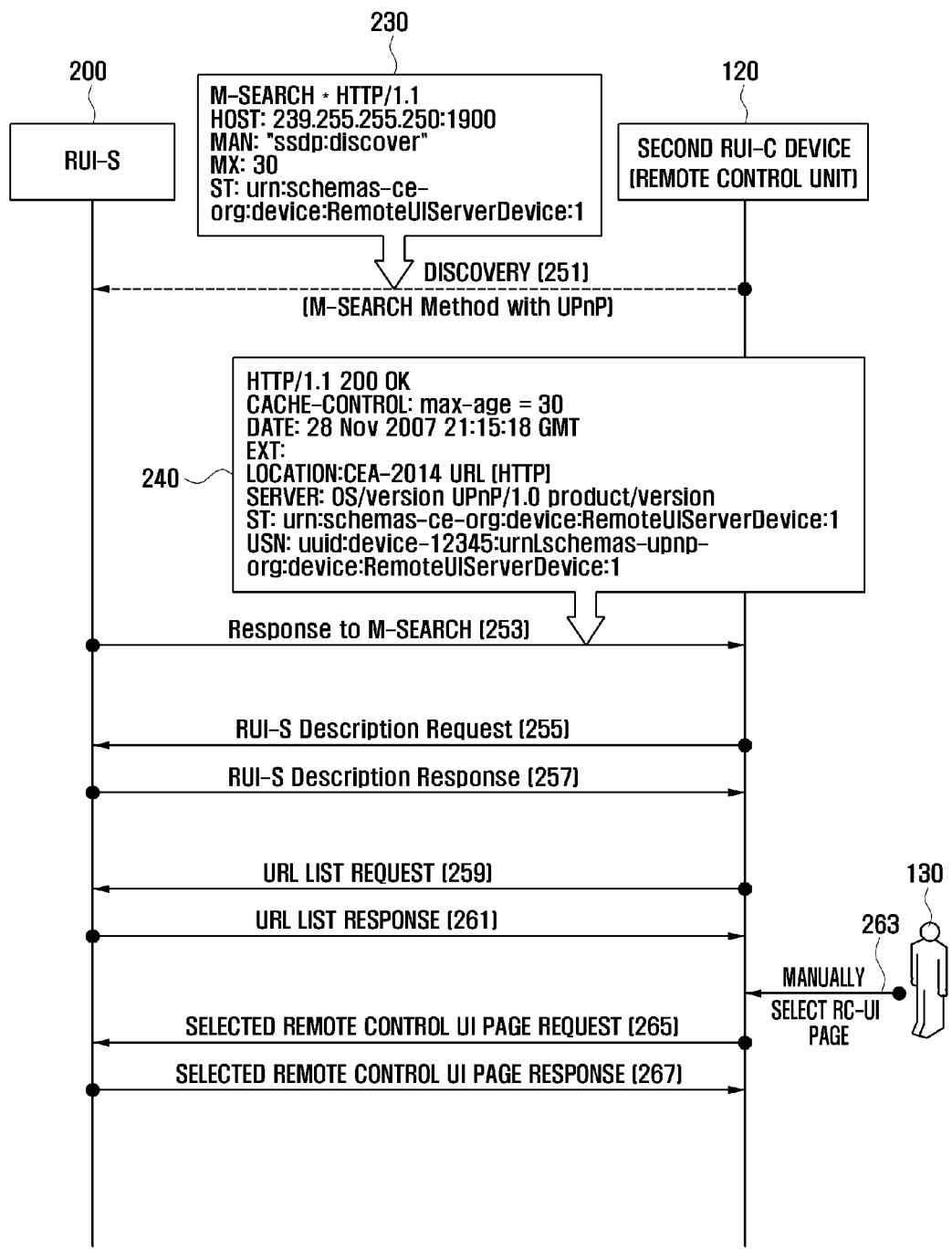

FIG. 3A

```
<?xml version="1.0"?>
<xs:schema xmlns:xs="http://www.w3.org/2001/XMLSchema" xmlns="urn:schemas-ce-org:cea-2014-server-ext-1-0" targetNamespace="urn:schemas-ce-org:cea-2014-server-ext-1-0" elementFormDefault="qualified" attributeFormDefault="unqualified">
<xs:element name="uiServerInfo">
    <xs:complexType>
        <xs:sequence>
            <xs:element name="uiListURL" type="xs:anyURI" minOccurs="1" maxOccurs="1"/>
            <xs:element name="savedUiListURL" type="xs:anyURI" minOccurs="0" maxOccurs="1"/>
            <xs:element name="saveStateStorageURL" type="xs:anyURI" minOccurs="0" maxOccurs="1"/>
        </xs:sequence>
    </xs:complexType>
</xs:element>
</xs:schema>
```

FIG. 3B

<!-- Note: description is either part of a root-device description OR used in the <devicelist>-element of another UPnP device as an embedded device description -->
...
<device xmlns:rui="urn:schemas-ce-org:cea2014-server-ext-1-0">
<deviceType>urn:schemas-ce-org:device:RemoteUIServerDevice:1</deviceType>
<friendlyName>short user-friendly device name</friendlyName>
<manufacturer>manufacturer name</manufacturer>
......
<iconList>
......
</iconList>
......
<rui:uiServerInfo>
<rui:uiListURL> URL that points to XML UI Listing </rui:uiListURL>
<rui:savedUIListURL>
   URL that points to the location at which the UI listing can be fetched that
   contains the information about the UI state information that has been stored
   at this Remote UI Server (optional to include this element)
</rui:savedUIListURL>
<rui:saveStateStorageURL>
   URL that points to the location at which UI state information can be saved using
   the save-restore mechanism (optional to include this element)
</rui:saveStateStorageURL>
</rui:uiServerInfo>
<serviceList> <!-- the service list includes the following service for a Level 1 remote UI server-->
   <service>
      <serviceType>urn:schemas-ce-org:service:RemoteUIServer:1</serviceType>
      <serviceId>urn:ce-org:serviceId:RemoteUIServer1</serviceId>
      <SCPDURL>http://... <!-- URL to service description --> </SCPDURL>
      <controlURL /> <!-- empty for Level 1 Remote UI Server -->
      <eventSubURL > http://... <!-- URL for eventing --> </eventSubURL>
   </service>
</serviceList>
</device>
...

FIG. 3C

```xml
<?xml version="1.0" encoding="UTF-8"?>
<uilist xmlns="urn:schemas-upnp-org:remoteui:uilist-1-0"
xmlns:xsi="http://www.w3.org/2001/XMLSchema-instance"
xsi:schemaLocation="urn:schemas-upnp-org:remoteui:uilist-1-0 CompatibleUIs.xsd">
    <ui>
        <uiID>6789-568</uiID>
        <name>DVD Browser</name>
        <protocol shortName="CE-HTML-1.0">
            <uri>http://1.8.7.2:333/DVDUI</uri>
            <protocolInfo>
                <relatedData xmlns="urn:schemas-ce-org:ce-html-server-caps-1-0">
                    <profilelist>
                        <ui_profile name="SD_UIPROF"/>
                    </profilelist>
                    <profilelist>
                        <ui_profile name="SD_UIPROF"/>
                        <video_profile name="MPEG_PS_PAL" type="video/mpeg"/>
                    </profilelist>
                </relatedData>
            </protocolInfo>
        </protocol>
    </ui>
    <ui>
        ...
    </ui>
</uilist>
```

FIG. 6B

```xml
<?xml version="1.0"?>
<xs:schema xmlns:xs="http://www.w3.org/2001/XMLSchema" xmlns="urn:schemas-ce-org:cea-2014-server-ext-1-0" targetNamespace="urn:schemas-ce-org:cea-2014-server-ext-1-0" elementFormDefault="qualified" attributeFormDefault="unqualified">
    <xs:element name="uiServerInfo">
        <xs:complexType>
            <xs:sequence>
                <xs:element name="uiListURL" type="xs:anyURI" minOccurs="1" maxOccurs="1"/>
                <xs:element name="savedUIListURL" type="xs:anyURI" minOccurs="0" maxOccurs="1"/>
                <xs:element name="saveStateStorageURL" type="xs:anyURI" minOccurs="0" maxOccurs="1"/>
                <xs:element name="remoteControlInfoURL" type="xs:anyURI" minOccurs="0" maxOccurs="1"/>
            </xs:sequence>
        </xs:complexType>
    </xs:element>
</xs:schema>
```

FIG. 7B

```xml
<?xml version="1.0" encoding="UTF-8"?>
<uilist xmlns="urn:schemas-upnp-org:remoteui:uilist-1-0"
xmlns:xsi="http://www.w3.org/2001/XMLSchema-instance"
xsi:schemaLocation="urn:schemas-upnp-org:remoteui:uilist-1-0 CompatibleUIs.xsd">
 <ui>
  <uiID>6789-568</uiID>
  <name>Default Remote Control UI</name>
  <protocol shortName="CE-HTML-1.0">
   <uri>http://1.8.7.2:333/DRC_UI</uri>
   <protocolInfo>
    <relatedData xmlns="urn:schemas-ce-org:ce-html-server-caps-1-0">
     <profilelist>
      <ui_profile name="SD_UIPROF"/>
     </profilelist>
    </relatedData>
   </protocolInfo>
  </protocol>
 </ui>
 <ui>
  :
 </ui>
</uilist>
```

FIG. 7C

```xml
<?xml version="1.0" encoding="UTF-8"?>
<uilist  xmlns="urn:schemas-upnp-org:remoteui:uilist-1-0"
xmlns:xsi="http://www.w3.org/2001/XMLSchema-instance"
xsi:schemaLocation="urn:schemas-upnp-org:remoteui:uilist-1-0 CompatibleUIs.xsd">
    <ui>
        <uiID>6789-568</uiID>
        <name>Current Device List Using RUI-S</name>
        <protocol shortName="CE-HTML-1.0">
            <uri>http://1.8.7.2:333/CurrentDeviceList_UI</uri>
            <protocolInfo>
                <relatedData xmlns="urn:schemas-ce-org:ce-html-server-caps-1-0">
                    <profilelist>
                        <ui_profile name="SD_UIPROF"/>
                    </profilelist>
                </relatedData>
            </protocolInfo>
        </protocol>
    </ui>
    <ui>
        : ...
    </ui>
</uilist>
```

FIG. 8B

```xml
<?xml version="1.0" encoding="UTF-8"?>
<uilist xmlns="urn:schemas-upnp-org:remoteui:uilist-1-0"
xmlns:xsi="http://www.w3.org/2001/XMLSchema-instance"
xsi:schemaLocation="urn:schemas-upnp-org:remoteui:uilist-1-0 CompatibleUIs.xsd">
    <ui>
        <uiID>6789-568</uiID>
        <name>DVD Brower</name>
        <protocol shortName="CE-HTML-1.0">
            <uri>http://1.8.7.2:333/DVDUI</uri>
            <rcu_uri>http://1.8.7.2:333/DVDUI_RC_UI</rcu_uri>
            <protocolInfo>
                <relatedData xmlns="urn:schemas-ce-org:ce-html-server-caps-1-0">
                    <profilelist>
                        <ui_profile name="SD_UIPROF"/>
                    </profilelist>
                    <profilelist>
                        <ui_profile name="SD_UIPROF"/>
                        <video_profile name="MPEG_PS_PAL" type="video/mpeg"/>
                    </profilelist>
                </relatedData>
            </protocolInfo>
        </protocol>
    </ui>
    <ui>
    ...
    </ui>
</uilist>
```

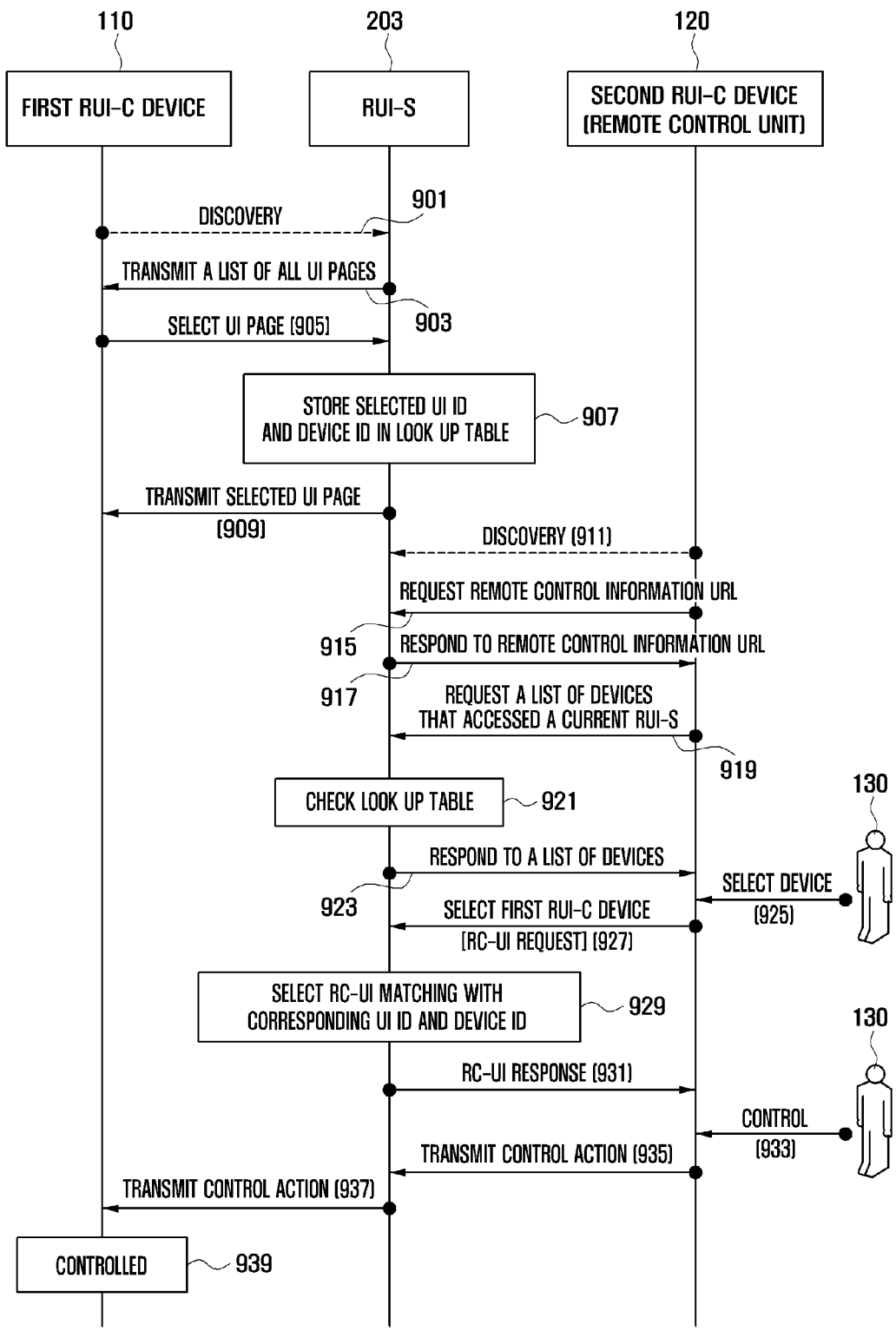

METHOD AND SYSTEM FOR CONTROLLING OTHER DEVICES USING A REMOTE USER INTERFACE

PRIORITY

This application claims priority under 35 U.S.C. §119(a) to a Korean Patent Application filed in the Korean Intellectual Property Office on Apr. 2, 2009, and assigned Serial No. 10-2009-0028470, the content of which is hereby incorporated by reference.

BACKGROUND OF THE INVENTION

1. Field of the Invention

The present invention relates generally to technology for controlling devices, and more particularly, to a method and system that enable one device to control a user interface of another device (i.e., a remote device), using a remote user interface.

2. Description of the Related Art

Many industry standard groups, such as Digital Living Network Alliance (DLNA), Home Audio-Video interoperability (HAVi), Universal Plug and Play (UPnP), etc., actively research and develop home network technology.

Remote User Interface (RUI) technology has been recently developed that enables one device to remotely control another remote device. RUI technology is achieved based on client-server architecture, where an RUI Client (RUI-C) fetches a UI from an RUI Server (RUI-S) so that a user at the RUI-C can control the RUI-S via the UI.

A Consumer Electronics Association (CEA) standard of RUI, CEA-2014, defines frameworks and protocols for an RUI over a UPnP network and the Internet. In CEA-2014, the UPnP device (i.e., RUI sever) provides user interfaces, via web pages in a Consumer Electronics HyperText Markup Language (CE-HTML) format, to a user (i.e., RUI client), and the user remotely controls the UPnP device via the web pages. The CE-HTML is a special version of HTML and based on eXtensible HyperText Markup Language (XHTML).

Because many services provided to conventional Personal Computer (PC) environments can also be provided to CE devices and mobile devices in similar formats, the UIs, which were previously established to meet the conventional PC requirements, need to be re-established to meet the requirements of CE and mobile devices. However, compared to the PC, it more difficult for CE and mobile devices to operate UIs on their generally smaller screens. Further, the PC enables the user to control the screen using input devices, such as a mouse, a keyboard, etc., while E and mobile devices generally limit interaction through a touchscreen or the existing input devices included therein.

SUMMARY OF THE INVENTION

The present invention has been made in view of at least the above-described problems, and provides a method and system that detect a Remote User Interface Server (RUI-S) that supports a remote control function.

The present invention further provides a method and system that identify an interface executed by a device and remotely control another device.

In accordance with an embodiment of the present invention, a method for a device to remotely control at least one remote device via a remote control interface is provided. The method includes discovering, by the device, a server that supports a remote control interface; receiving, by the device, a list of remote devices that the device can control, from the server; receiving a selection input to select a remote device from the list of remote devices; transmitting a device selection request corresponding to the selection input to the server; receiving a remote control interface corresponding to the device selection request from the server; and controlling the selected remote device via the received remote control interface.

In accordance with another embodiment of the present invention, a system for remotely controlling devices is provided. The system includes a server for mapping and storing interfaces and remote control interfaces for controlling the interfaces; remote devices for receiving and executing the interfaces from the server; and a device for receiving the remote control interfaces from the server and controlling interfaces of the remote device via the received remote control interfaces.

BRIEF DESCRIPTION OF THE DRAWINGS

The above and other features and advantages of the present invention will become more apparent from the following detailed description, in conjunction with the accompanying drawings, in which:

FIG. 2 is a signal flow chart illustrating a discovery method, where a user manually selects a UI;

FIGS. 3A and 3B illustrate eXtensible Markup Language (XML)-implemented programs that outline description information according to the method illustrated in FIG. 2;

FIG. 3C illustrate an XML-implemented program of an interface list illustrated in FIG. 2;

FIG. 6B illustrates a program that outlines description information according to an embodiment of the present invention;

FIGS. 7B and 7C illustrate programs that describe remote control information according to an embodiment of the present invention;

FIG. 8B illustrates a program that describes an interface list according to an embodiment of the present invention; and FIG. 9 is a signal flow chart illustrating a method for controlling other devices via remote interfaces, according to an embodiment of the present invention.

DETAILED DESCRIPTION OF EMBODIMENTS OF THE INVENTION

Figure 1:
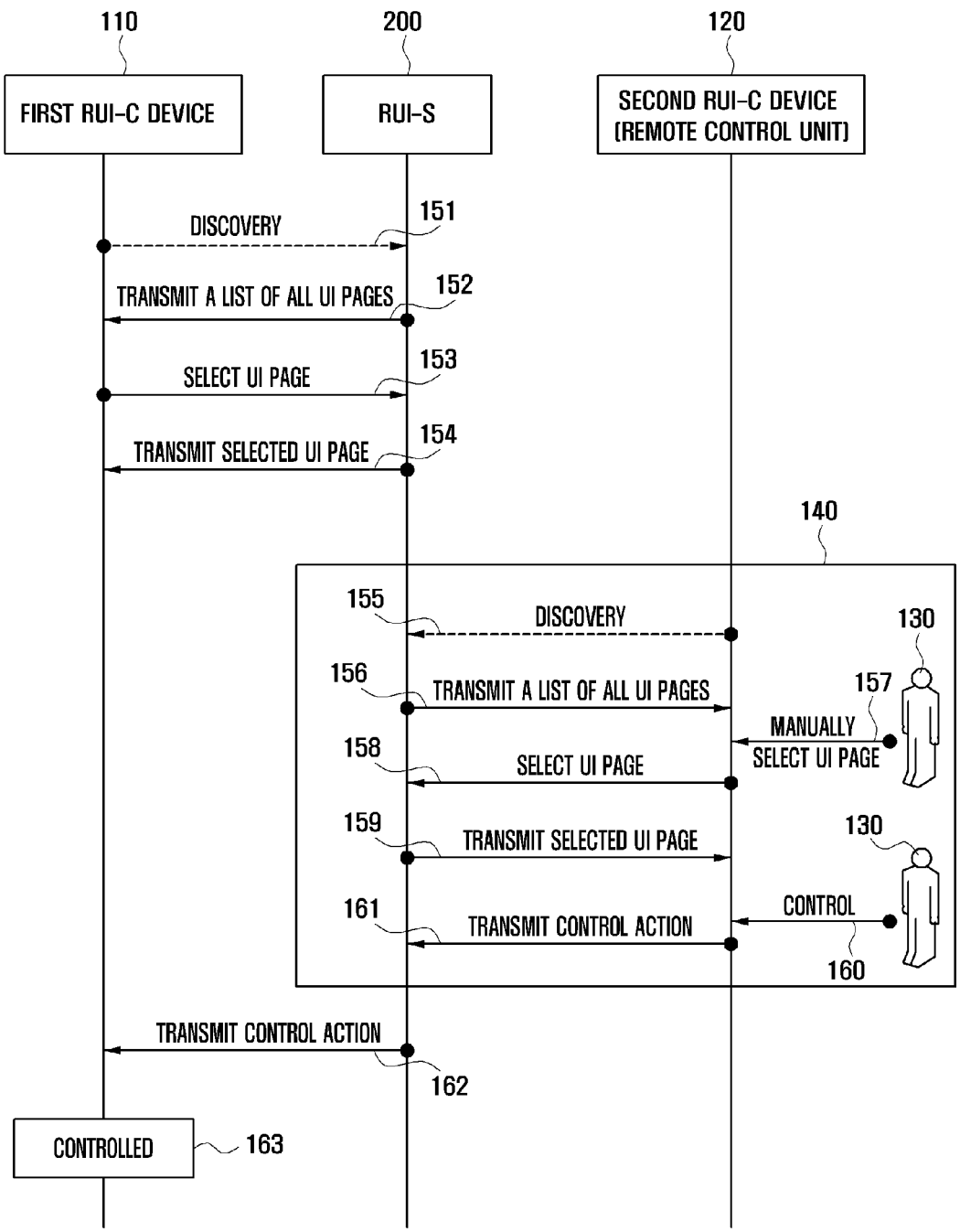
FIG. 1 is a signal flow chart illustrating a method for controlling a device using a remote control user interface, where a user manually selects a UI.

Various embodiments of the present invention are described in detail herein below with reference to the accompanying drawings. In the drawings, the same or similar elements are denoted by the same reference numerals even though they are depicted in different drawings. In the following description, a detailed description of known functions and configurations incorporated herein will be omitted when it may obscure the subject matter of the present invention.

FIG. 1 is a signal flow chart illustrating a method for controlling a device using a remote control user interface, where a user 130 manually selects a UI.

Referring to FIG. 1, a second RUI Client (RUI-C) device 120 intends to control an interface (UI pages) operated in a first RUI-C device 110.

The first RUI-C device 110 discovers an RUI Server (RUI-S) 200 in step 151. In step 152, the first RUI-C device 110 receives description information from the RUI-S 200 and acquires information regarding a list of interfaces (UI pages) included the RUI-S 200.

The first RUI-C device 110 selects one of the received interfaces to be processed by a rendering process, transmits the information regarding the selected interface to the RUI-S 200 in step 153, and then receives the selected interface from the RUI-S 200 in step 154.

If the user 130 wants to control the interface, which is being currently rendered by the first RUI-C device 110, via the second RUI-C device 120, the following procedure is performed.

In step 155, the second RUI-C device 120 and the RUI-S 200 discover each other. Similar to the operation of the first RUI-C device 110, the second RUI-C device 120 receives a list of interfaces included in the RUI-S 200, from the RUI-S 200 in step 156.

The second RUI-C device 120 displays the received list. The user 130 then reviews the received list of all interfaces, and selects, based on prior knowledge or the user's 130 estimation, a remote control interface (Remote Control-UI page (RC-UI page)), which can control the interface that the first RUI-C device 110 is currently rendering in step 157. In step 158, the second RUI-C device 120 transmits the UI page selected by the user 130 to the RUI-S 200.

If the user 130 fails to select the correct remote control interface in step 157, the user 130 must continue to perform steps 156 and 157, until the correct remote control interface is selected from the received list.

When the user has selected the correct remote control interface, the RUI-S 200 transmits the selected remote control interface to the user 130 in step 159, enabling the second RUI-C device 120 to render a corresponding remote control interface therein.

The user 130 operates the rendered remote control interface in step 160, and transmits a control action according to the user's operation to the RUI-S 200 in step 161. The RUI-S 200 transmits the control action to the first RUI-C device 110 in step 162. The first RUI-C device 110 receives the control action and is then controlled by the received control action in step 163.

As described above, under the CEA-2014 standard, in order to control the first RUI-C device 110 via the second RUI-C device 120, the user 130 needs to individually check the remote control interfaces for controlling the first RUI-C device 110 in the RUI-S 200 and to manually select one of them. Thereafter, the user 130 controls the UI that is currently being operated in the first RUI-C device 110, using the selected RC UI.

In the CEA-2014 standard, there is no method for distinguishing RC-UI.

FIG. 2 is a signal flow chart illustrating a discovery method, where a user 130 manually selects a UI.

Referring to FIG. 2, the second RUI-C device 120 discovers an RUI-S 200 using a UPnP M-SEARCH message 230 in step 251. To this end, a Search Target (ST) is a "RemoteUIServerDevice."

When the second RUI-C device 120 has discovered the RUI-S 200 in step 251, the RUI-S 200 transmits a response with respect to the M-SEARCH message to the second RUI-C device 120 in 253. The response to the M-SEARCH message includes description information of the RUI-S 200 in a LOCATION field.

The second RUI-C device 120 requests description information regarding the RUI-S 200 via the LOCATION information and receives it from the RUI-S 200 in steps 255 and 257. The second RUI-C device 120 extracts a Uniform Resource Locator (URL) of a list of interfaces (UI pages) included in the description information.

The second RUI-C device 120 requests a list of interfaces via a corresponding URL in step 259, and receives the list of interfaces from the RUI-S 200 in step 261.

The user 130 manually selects a remote control interface (RC-UI page) from the received list of interfaces in step 263.

The second RUI-C device 120 receives the RC-UI page selected by the user 130, and transmits the RC-UI page request to the RUI-S 200 in step 265. The RUI-S 200 receives the RC-UI page request and transmits a corresponding RC-UP page to the second RUI-C device 120 in step 267. The second RUI-C device 120 provides the received RC-UI page to the user 130, so that the user 130 can control the RUI-S 200 or the first RUI-C device 110 via the RC-UI page displayed on the second RUI-C device 120.

FIGS. 3A and 3B illustrate XML-implemented programs that outline description information according to the method illustrated in FIG. 2. More specifically, FIG. 3A illustrates a description schema of a server (RUI-S) in the CEA-2014, and FIG. 3B illustrates an example of a description of a server (RUI-S), UPnP device description schema.

The second RUI-C device 120 needs the description information regarding the RUI-S 200 in order to fetch a list of the UI pages from the RUI-S 200, as illustrated in FIG. 2. In the description information as shown in FIG. 3A, there is an element whose name is an address of an interface list, uiListURL.

The second RUI-C device 120 can acquire information regarding the list of the interfaces that the RUI-S 200 has, via the address of the interface list, uiListURL.

FIG. 3C illustrates a program that describes an interface list according to the method illustrated in FIG. 2.

As illustrated in FIG. 3C, an interface list, i.e., an XML UI List, includes information regarding a list of interfaces included in the RUI-S 200. A Root element includes one interface list, i.e., uilist. The uilist includes a plurality of interfaces elements, i.e., ui elements, each of which is one page.

As described above, the technology that enables a user to control the first RUI-C device 110 via the second RUI-C device 120 has several problems.

More specifically, in the CEA-2014 standard, there is no method for distinguishing an interface used by the first RUI-C device 110 from a remote control interface that can be used by the second RUI-C device 120, which is among the list of interfaces included in the RUI-S 200. That is, if there are a plurality of interfaces that can be displayed by the first RUI-C device 110 and remote control interfaces corresponding to each interface, there is no method that for identifying a specific remote control interface (RC-UI Page) that can individually control a specific interface.

Accordingly, there is no method for the second RUI-C device 120 to easily receive a correct remote control interface to control the UI that is currently being operated in the first RUI-C device 110. In order to resolve these problems, a modified method for remote control is needed.

Figure 4:
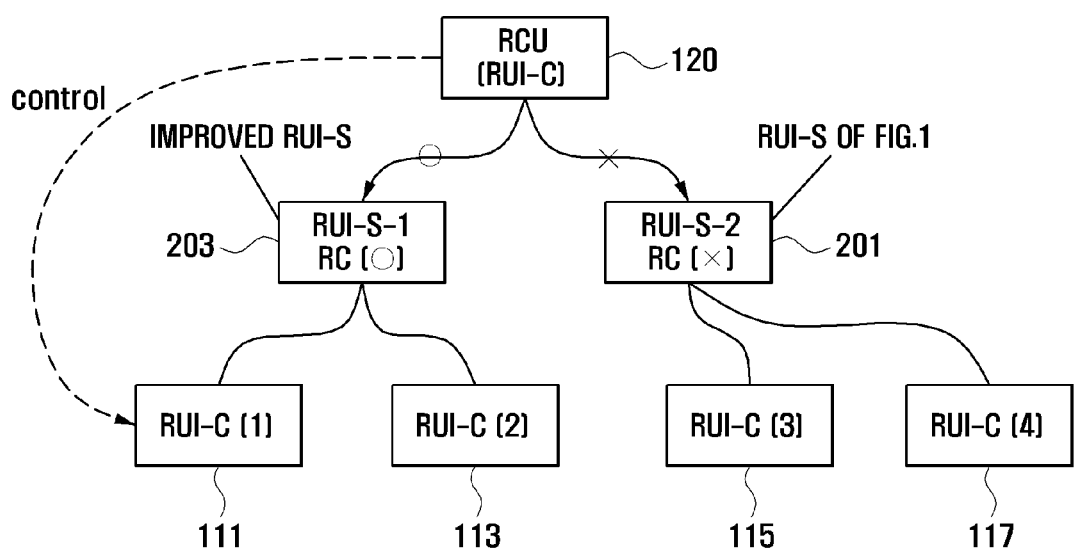
FIG. 4 illustrates a system for remotely controlling other devices using a remote user interface, according to an embodiment of the present invention.

FIG. 4 illustrates a system for remotely controlling other devices using a remote user interface, according to an embodiment of the present invention.

Referring to FIG. 4, the system for remotely controlling other devices includes at least two devices for supporting a remote control interface and a server for the devices. Specifically, the system includes a plurality of first RUI-C devices 111, 113, 115, and 117, i.e., other devices to be controlled, second RUI-C device 120, i.e., the device to control the first RUI-C devices 111, 113, 115, and 117, an RUI-S-1 203, which is an improved server according to an embodiment of the present invention, and an RUI-S-2 201, which is a conventional server as illustrated in FIG. 1.

In accordance with an embodiment of the present invention, the RUI-S 203 and the RUI-S 201 can support and have a remote control interface (RC-UI page). In this case, however, only RUI-S 203 can be discovered by the second RUI-C device 120. Therefore, access to the RUI-S 203 can be automatically achieved. In order to use a remote control interface (RC-UI page) included in the RUI-S 201, the user needs to know that the RUI-S 201 has the remote control interface and must manually select the RUI-S 201.

When the second RUI-C device 120 is connected to the RUI-S 203 and a user of the second RUI-C device 120 wants to control one of the first RUI-C devices 111 and 113, which are connected to the RUI-S 203, the RUI-S 203 can be used to acquire a list of the first RUI-C devices that are currently displaying an interface (UI page), which can be controlled by the Remote Control UI (RC-UI page). If the user selects one of the first RUI-C devices that are currently displaying a UI page, an RC-UI page that can control the selected first RUI-C device can be automatically acquired.

If there is only one first RUI-C device that is currently displaying a UI page that can be controlled by an RC-UI page, the RC-UI page can be automatically displayed, without acquiring a list of first RUI-C devices. Thereafter, the user can control the UI page that is currently being displayed on the screen of a corresponding first RUI-C device, via the RC-UI page.

A list of first RUI-C devices that are currently displaying a UI page that can be controlled by an RC-UI page) cannot be received via the RUI-S 201. As described in conjunction with FIG. 1, the user needs to acquire a list of interfaces (UI pages) included in the RUI-S 201 and then select a remote control interface (RC-UI page) that seems to be related to a first RUI-C device that the user wishes to control, by viewing the names of the UI pages.

Figure 5:
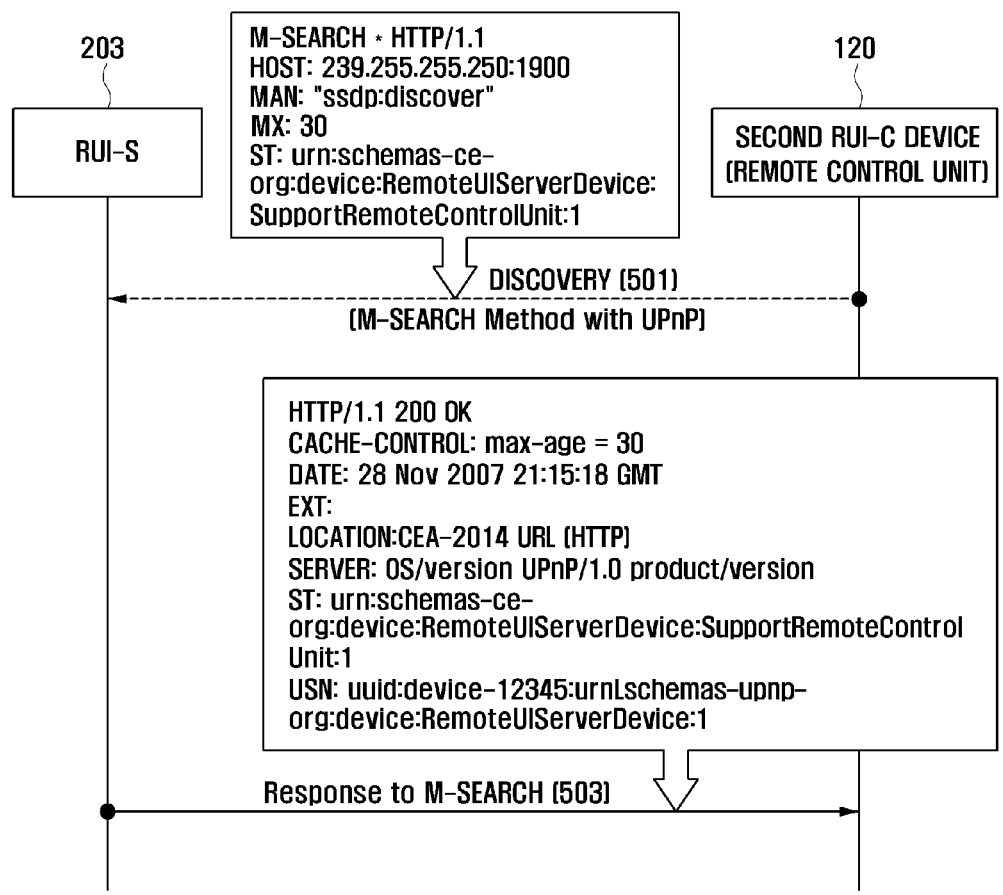
FIG. 5 is a signal flow chart illustrating a discovery method according to an embodiment of the present invention.

FIG. 5 is a signal flow chart illustrating a discovery method according to an embodiment of the present invention.

Referring to FIG. 5, the second RUI-C device 120 discovers the RUI-S 203 that can support remote control, via a search message in step 501. The discovery method using the search message may be a "UPnP Discovery" method defined in the CEA-2014 standard. In that case, the search message may be an M-SEARCH message.

In accordance with an embodiment of the present invention, the search messages include a property asking whether to support remote control, in order to search whether the RUI-S 203 supports remote control.

For example, in a conventional method for discovering an RUI-S in the CEA-2014 standard, the M-SEARCH message is used in two ways; first, its search target (ST) header contains "urn:schemas-ce-org:device:RemoteUIServerDevice:1"; and second, "urn:schemas-upnp-org:device:RemoteUIServerDevice:1".

In accordance with an embodiment of the present invention, as illustrated in FIG. 5, the M-SEARCH message adds a deviceType, "urn:schemas-ce-org:device:RemoteUIServerDevice:SuppportRemotecontrolUn it:1", to its ST header. This property enables the second RUI-C device 120 to detect whether the RUI-S 203 supports remote control.

If the RUI-S 203 that received a search message supports a remote control function, it transmits a response message to the second RUI-C device 120 in step 503. The response message includes a URL regarding description information in its LOCATION field. The description information is provided in URL format, so that the second RUI-C device 120 is linked to the provided URL and acquires corresponding description information. Alternatively, the RUI-S 203 can directly provide the description information to the second RUI-C device 120.

As described above, the second RUI-C device 120 can acquire description information from the RUI-S 203. The description information will be explained in more detail below with reference to FIGS. 6A and 6B.

Figure 6A:
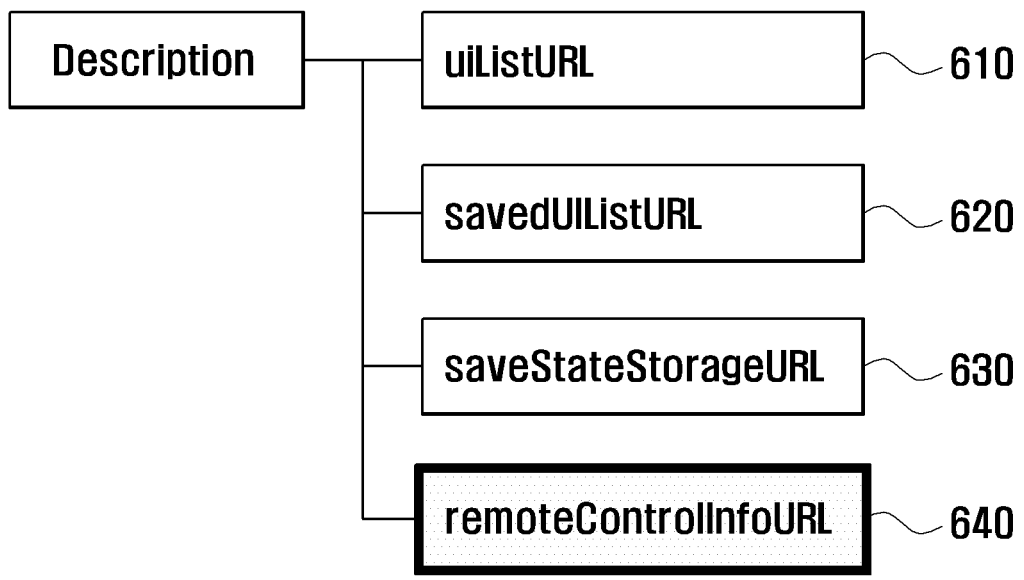
FIG. 6A illustrates description information according to an embodiment of the present invention.

FIG. 6A illustrates description information according to an embodiment of the present invention.

Referring to FIG. 6A, description information includes an interface list (uiListURL) 610, a saved interface list (savedUIListURL) 620, a save state storage (saveStateStorageURL) 630, and a remote control information (remoteControlInfoURL) 640.

The description information is provided in the URL format, so that the second RUI-C device 120 is linked to the provided URL and acquires corresponding description information.

FIG. 6B illustrates a program that describes description information according to an embodiment of the present invention.

Referring to FIG. 6B, the interface list 610 refers to a list of interfaces stored in the RUI-S 203 and includes information regarding each interface. Each interface includes a general interface (UI page) and a remote control interface (RC-UI page).

The remote control information (remoteControlInfoURL) 640 refers to information regarding an RC-UI page that supports remote control according to an embodiment of the present invention. The remote control information (remoteControlInfoURL) 640 provides user interface identifiers, addresses of pages providing corresponding user interfaces, etc.

A detailed description of the remote control information (remoteControlInfoURL) 640 will be provided below with reference to FIGS. 7A and 7C.

Figure 7A:
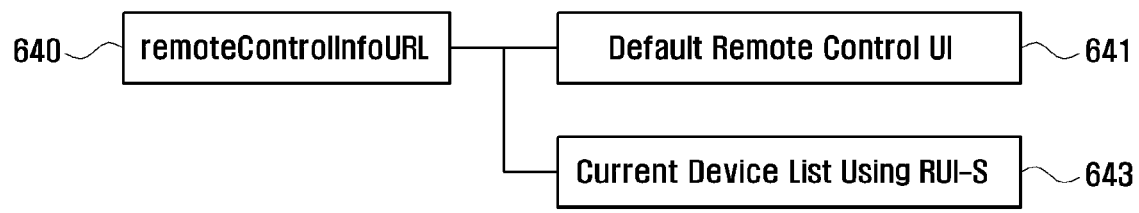
FIG. 7A illustrates remote control information according to an embodiment of the present invention.

FIG. 7A illustrates remote control information according to an embodiment of the present invention.

Referring to FIG. 7A, the remote control information (remoteControlInfoURL) 640 includes default interface information (Default Remote Control UI) 641 and current controllable interface (Current Device List Using RUI-S) 643. The default interface information (Default Remote Control UI) 641 refers to information regarding an interface providing a common use environment, instead of a specialized remote control interface (RC-UI page) in order to control an interface (UI page) displayed on the first RUI-C device 110.

Remote control information (Remote Control Info URL) for acquiring the default interface information (Default Remote Control UI) 641 can be implemented with an eXtension Markup Language (XML).

FIG. 7B illustrates an XML implemented program that describes remote control information according to an embodiment of the present invention.

Referring to FIG. 7B, the current controllable interface (Current Device List Using RUI-S) 643 is a list of first RUI-C devices 110 currently displaying an interface that can be controlled by the second RUI-C device 120, from among the first RUI-C devices 110.

Remote control information (Remote Control Info URL), for acquiring a list of first RUI-C devices 110, currently linked to the RUI-S 203 and being used, can be implemented with XML.

FIG. 7C illustrates an XML implemented program that describes remote control information according to an embodiment of the present invention.

Figure 8A:
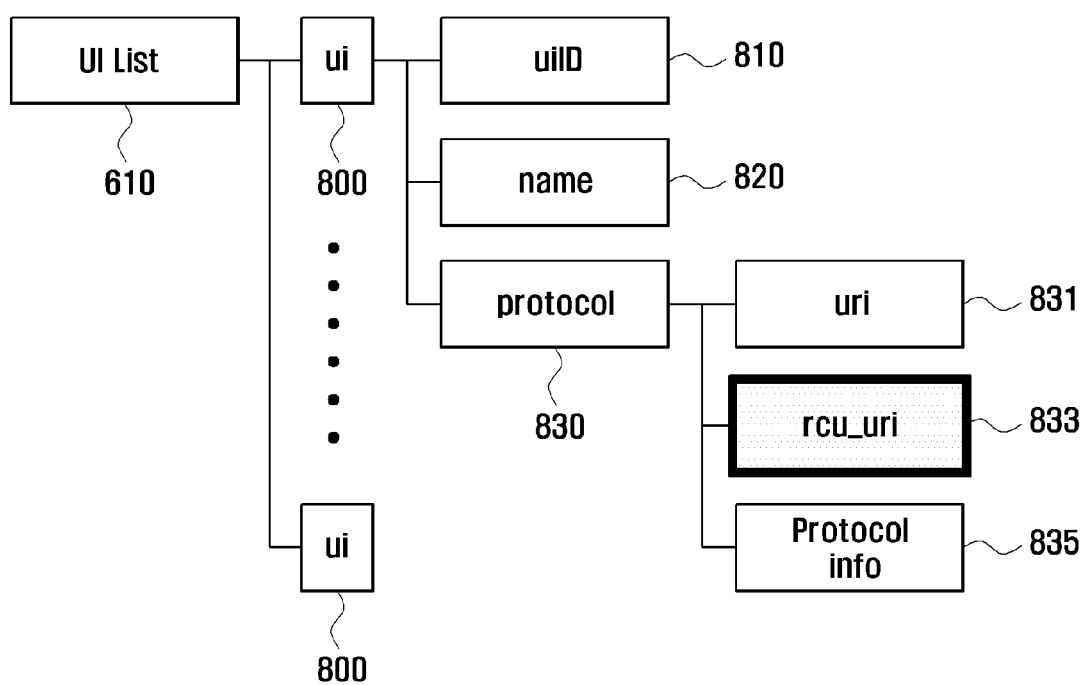
FIG. 8A illustrates an interface list according to an embodiment of the present invention.

FIG. 8A illustrates an interface list (uiListURL) according to an embodiment of the present invention.

Referring to FIG. 8A, the interface list (uiListURL) 610 includes all interfaces that differ from each other, and information regarding each interface.

The interfaces include general interfaces (UI pages) and remote control interfaces (RC-UI page) for remotely controlling the general interfaces.

Each interface includes an identifier field (uiID) 810, a name field (Name) 820, and a protocol field (protocol) 830.

The identifier field (uiID) 810 refers to identification information to identify interfaces. The name field (Name) 820 is a value that enables a user to identify an RUI-C device using a corresponding interface.

The protocol field (protocol) 830 includes an address (uri) 831, a remote control interface address (rcu_uri) 833, and protocol information (protocol info) 835. The remote control interface address (rcu_uri) is a link address of a remote control interface (RC-UI page) that can control a currently displayed interface (UI page).

The interface list (uiListURL) 610 of the description information can be provided in the URL format. The interface list (uiListURL), linked to a provided URL and acquired there from, is implemented with an XML.

FIG. 8B illustrates a program that describes an interface list according to an embodiment of the present invention.

Referring to FIG. 8B, the interface list includes information regarding a plurality of interfaces. Each interface includes an identifier (uiID), a name (Name), and a protocol (protocol). The protocol includes an address (uri), a remote control interface address (rcu_uri), and protocol information (protocol info).

FIG. 9 is a signal flow chart illustrating a method for controlling other devices via remote interfaces, according to an embodiment of the present invention.

Referring to FIG. 9, a first RUI-C device 110 discovers the RUI-S 203 in step 901.

In step 903, the RUI-S 200 transmits an interface list (uiListURL) to the first RUI-C device 110. The interface list (uiListURL) is included in the description information.

The first RUI-C device 110 selects an interface (ui) to be rendered, from the received interface list, and then transmits information (for example, uiID) indicating the selected interface to the RUI-S 203 in step 905.

If the second RUI-C device 120 can control the interface (ui) selected by the first RUI-C device 110, the RUI-S 203 stores the interface (ui) in a look up table in step 907. More specifically, the RUI-S 203 stores an identifier (uiID) and a device identifier (device ID) in the look up table. That is, the RUI-S 200 maps the first RUI-C device 110 to a UI page and stores it in the look up table.

Table 1, below, is an example of a look up table according to an embodiment of the present invention.

TABLE 1

| Device IP: Port | Device ID/Name | ui ID |
|---|---|---|
| 192.168.100.1: 8080 | TV, XXX manufacturer | 4560-9876-1265-8758 |
| 192.168.100.2: 8080 | DVD, YYY manufacturer | 6789-5689-4212-2443 |

As shown in Table 1, in order to remotely control the first RUI-C device 110, the second RUI-C device 120 includes information regarding the first RUI-C device 110 and information regarding an interface (UI page) that is currently rendered by the first RUI-C device 110.

Further, the look up table includes fields of "Device IP:Port", "Device ID/Name" and "ui ID".

The "Device IP:Port" field describes an IP of the first RUI-C device 110 and an access port. The Internet Protocols (IPs) are used to distinguish the first RUI-C devices. Access to a first RUI-C device can be achieved through a corresponding IP and a corresponding access port.

The "Device ID/Name" field describes a value to identify first RUI-C devices. The value is recognized by a user (human) not by an apparatus. For example, the value of the Device ID/Name field may be "TV of an XXX manufacturer" or "DVD of YYY manufacturer".

The "ui ID" field describes an identifier of an interface (ui) that the first RUI-C device 110 is currently displaying on its screen. For example, as described in FIG. 8B, the identifier (uiID) described in the "ui ID" field may have an identifier (uiID) 810 of a corresponding interface (UI) 800 in the interface list 610 of the description information.

After generating and storing the look up table at step 907, the RUI-S 200 transmits the interface (UI page) selected by the first RUI-C device 110 to the first RUI-C device 110 in step 909. The first RUI-C device 110 displays the received interface (UI page) so that the user can use it.

While the user is using the interface (UI page), transmitted from the RUI-S 203, via the first RUI-C device 110, the interface (UI page) can be controlled by the second RUI-C device 120 serving as the other device.

More specifically, the second RUI-C device 120 discovers the RUI-S 203 on a network in step 911. In particular, the second RUI-C device 120 selectively discovers the RUI-S 203 that supports only a remote control function, as described in conjunction with FIG. 5.

The second RUI-C device 120 receives description information regarding the RUI-S 203 from the RUI-S 203, and then extracts information regarding remote control information, Remote Control Info URL, from the description information.

In step 915, the second RUI-C device 120 links to a corresponding address (URL) and requests remote control information, Remote Control Info, from the RUI-S 203. In response to the request, the RUI-S 203 transmits the remote control information, Remote Control Info, to the second RUI-C device 120 in step 917.

As described in conjunction with FIG. 7A, the remote control information, Remote Control Info URL, includes information regarding a remote control user interface set as default, Default Remote Control UI, which has a common function regarding the interfaces (UI pages), and a current controllable device list, Current Device List Using RUI-S, i.e., a list of first RUI-C devices displaying controllable interfaces (UI pages).

The second RUI-C device 120 extracts an address of a current controllable device list, Current Device List Using RUI-S, of the first RUI-C devices 110 currently linked to the RUI-S 203, from the remote control information, Remote Control Info URL.

In step 919, the second RUI-C device 120 requests a list of first RUI-C devices, currently linked to the RUI-S 203, from the RUI-S 203, via the extracted address.

The RUI-S 203 compares the address of the current controllable device list, Current Device List Using RUI-S, with the look up table in step 921, and transmits the list of first RUI-C devices stored in the look up table to the second RUI-C device 120 in step 923. In particular, the RUI-S 203 transmits the fields of the first RUI-C devices, "Device ID/Name," stored in the look up table, to the second RUI-C device 120. The second RUI-C device 120 displays the value described in the "Device ID/Name" field on its display unit.

As described above, the "Device ID/Name" field describes a value, such as "TV of an XXX manufacturer," "DVD of YYY manufacturer," etc., so that the user can easily identify the corresponding device. The value of the "Device ID/Name" field is a value that is mapped to the first RUI-C device 110. Therefore, the user watches the field value and can easily select the first RUI-C device 110.

When the user selects the first RUI-C device 110 by operating the second RUI-C device 120 in step 925, the second RUI-C device 120 transmits the information indicating the user's selected first RUI-C device 110 to the RUI-S 203 in step 927, in order to request an RC-UI that can remotely control a UI page being executed in a corresponding first RUI-C device 110.

The RUI-S 203 compares an identifier (ui ID) corresponding to the first RUI-C device 110 with the interface list (uiListURL) as described in FIGS. 8A and 8B, referring to the look up table, and selects a remote control interface (RC-UI) mapped to a corresponding identifier in step 929. That is, the RUI-S 203 extracts an address (URL) of a remote control interface (RC-UI page), rcu_uri, from the interface list (uiListURL), where the RC-UI page can remotely control a UI page currently being executed in the first RUI-C device 110.

In step 931, the RUI-S 203 refers to and executes an address (URL) of the extracted remote control interface (RC-UI page), and transmits the remote control interface (RC-UI page) to the second RUI-C device 120.

The second RUI-C device 120 can perform a control operation via the received remote control interface (RC-UI page). That is, when the second RUI-C device 120 displays the received remote control interface (RC-UI page) on the screen, the user controls the remote control interface (RC-UI page) being rendered in the second RUI-C device 120, by operating the second RUI-C device 120 in step 933.

When the user controls the remote control interface (RC-UI page) at RUI-C device 120, the second RUI-C device 120 transmits a control action according to corresponding control to the RUI-S 203 in step 935.

The RUI-S 203 transmits the control action to the first RUI-C device 110 in step 937. The first RUI-C device 110 is controlled according to the control action in step 939. That is, the RUI-S 203 controls the first RUI-C device 110 via a "PUSH" or "Pulling" mode according to a user's preference.

As described above, the method and system according to the present invention enable a user of a device to control another device by automatically discovering a remote user interface server (RUI-S) that supports remote control user interface (RC-UI) pages.

In addition, the method and system can automatically detect a device (first RUI-C device) currently executing a UI that can be controlled with RC-UI pages.

Therefore, the method and system enable a user to control UI page displayed on a screen of a first RUI-C device, using a second RUI-C device, via a server (URI-S).

Although certain embodiments of the present invention have been described in detail hereinabove, it should be understood that many variations and modifications of the basic inventive concept herein described, which may be apparent to those skilled in the art, will still fall within the spirit and scope of the embodiments of the present invention as defined in the appended claims.

What is claimed is:

1. A method for remotely controlling at least one remote device, by a device, via a Remote Control User Interface (RC-UI), the method comprising:

discovering, by the device, a server external to the device that supports the RC-UI;

receiving, by the device, from the server, a list of remote devices that the device can control and are currently rendering a User Interface (UI);

receiving, by the device, a selection input that selects a remote device from the list of the remote devices;

transmitting, to the server, a device selection request corresponding to the selection input;

receiving, by the device, an RC-UI page mapped in the server to a UI page transmitted from the server to the selected remote device, according to the device selection request from the server; and controlling, by the device, the selected remote device via the received RC-UI page, wherein the device and the remote devices are Remote User Interface Clients (RUI-Cs) and the server is a Remote User Interface Server (RUI-S), and wherein the RC-UI page is transmitted from the server to the device based on a reference table comprising information on a remote device IDentification (ID) and a UI ID indicating the UI-page.

2. The method of claim 1, further comprising:

transmitting, by the device, a remote control information request to the server;

receiving, by the device, remote control information corresponding to the remote control information request from the server; and requesting, by the device, the list of remote devices using the received remote control information.

3. The method of claim 1, wherein the list of the remote devices includes path information regarding the RC-UI corresponding to the remote devices that can be controlled by the device and are currently rendering the UI, and wherein the device selection request includes the path information regarding the RC-UI corresponding to the selected remote device.

4. An electronic device for remotely controlling at least one remote device via a Remote Control User Interface (RC-UI), comprising:

a controller for discovering a server external to the device that supports the RC-UI;

a receiver for receiving, from the server, a list of remote devices that the device can control and are currently rendering a User Interface (UI);

an input unit that receives a selection input that selects a remote device from the list of remote devices; and a transmitter for transmitting, to the server, a device selection request corresponding to the selection input, wherein the receiver receives an RC-UI page mapped by the server to a UI page transmitted from the server the selected remote device according to the device selection request from the server, wherein the controller controls the selected remote device via the received RC-UI page, wherein the device and the remote devices are Remote User Interface Clients (RUI-Cs) and the server is an Remote User Interface Server (RUI-S), and wherein the RC-UI page is transmitted from the server to the device based on a reference table comprising information on a remote device IDentification (ID) and a UI ID indicating the UI-page.

5. The electronic device of claim 4, wherein the transmitter transmits a request for a list of remote devices to the server, and the receiver receives the list of the remote devices from the server in response to the request for the list of remote control devices.

6. The electronic device of claim 5, wherein the transmitter transmits a remote control information request to the server, the receiver receives, from the server, remote control information corresponding to the remote control information request, and the transmitter transmits a request for the list of the remote devices to the server, using the received remote control information.

7. The electronic device of claim 5, wherein the list of the remote devices that the device can control includes path information regarding the RC-UIs corresponding to the remote devices that can be controlled by the device and that are currently rendering the UI.

8. The electronic device of claim 4, wherein the transmitter transmits a device selection request including path information regarding a RC-UI corresponding to the selected remote device, to the server.

9. A method for remotely controlling at least one remote device, by a server, via a Remote Control User Interface (RC-UI), the method comprising:

transmitting, by the server, to a device, a list of remote devices that the device can control and are currently rendering a User Interface (UI);

receiving, by the server, from the device, a device selection request for selecting a remote device from the list of the remote devices; and transmitting, by the server, to the device, a RC-UI page mapped in the server to a UI page transmitted from the server to the selected remote device according to the device selection request, wherein the RC-UI page is used to control the selected remote device, the device and the remote devices are Remote User Interface Clients (RUI-Cs) and the server is an Remote User Interface Server (RUI-S), and wherein the RC-UI page is transmitted from the server to the device based on a reference table comprising information on a remote device IDentification (ID) and a UI ID indicating the UI-page.

10. The method of claim 9, further comprising:

storing, by the server, at least one RC-UI corresponding to each of the at least one remote device.

11. The method of claim 9, further comprising:

receiving, by the server, from the device, a remote control information request;

transmitting, by the server, to the device, remote control information corresponding to the remote control information request; and receiving, by the server, from the device, a request for the list of remote devices that the device can control and are currently rendering the UI, the request being transmitted using the received remote control information.

12. The method of claim 9, wherein the list of the remote devices includes path information regarding the RC-UI corresponding to the remote device that can be controlled by the device and are currently rendering the UI, and wherein the device selection request includes the path information regarding the RC-UI corresponding to the selected remote device.

13. An electronic server device for remotely controlling at least one remote device via a Remote Control User Interface (RC-UI), the server comprising:

a transmitter for transmitting, to a device, a list of remote devices that the device can control and are currently rendering a User Interface (UI) and a receiver for receiving, from the device, a device selection request for selecting a remote device from the list of the remote devices, wherein the transmitter transmits, to the device, a RC-UI page mapped in the server to a UI page transmitted from the server to the selected remote device according to the device selection request, wherein the RC-UI page is used to control the selected remote device, the device and the remote devices are Remote User Interface Clients (RUI-Cs) and the server is an Remote User Interface Server (RUI-S), and wherein the RC-UI page is transmitted from the server to the device based on a reference table comprising information on a remote device IDentification (ID) and a UI ID indicating the UI-page.

14. The electronic server device of claim 13, further comprising a memory for storing at least one RC-UI corresponding to each of the at least one remote device.

15. The electronic server device of claim 13, wherein the receiver receives, from the device, a remote control information request, the transmitter transmits, to the device, remote control information corresponding to the remote control information request, and the receiver receives, from the device, a request for the list of remote devices that the device can control and are currently rendering the UI, the request being transmitted using the received remote control information.

16. The electronic server device of claim 13, wherein the list of the remote devices includes path information regarding the RC-UI corresponding to the remote device that can be controlled by the device and are currently rendering the UI, and wherein the device selection request includes the path information regarding the RC-UI corresponding to the selected remote device.

* * * * *